United States Patent Office 3,064,950
Patented Nov. 20, 1962

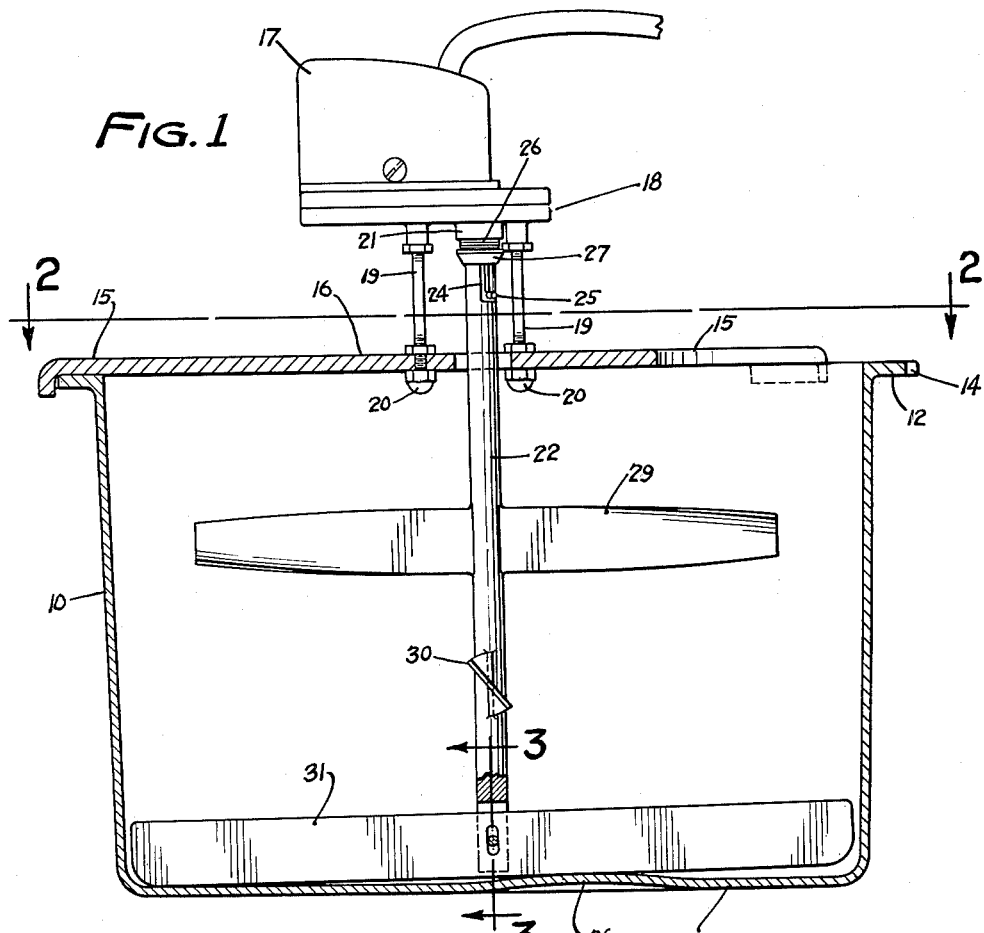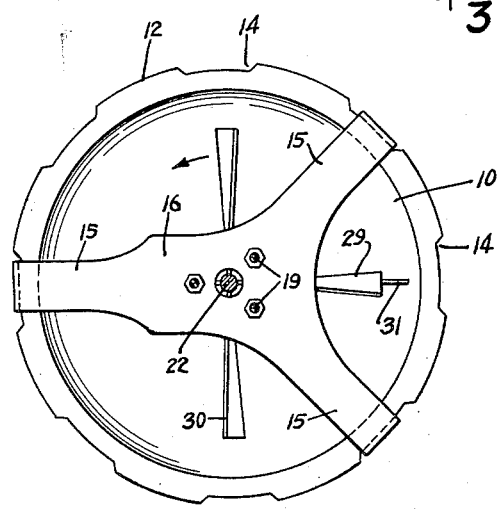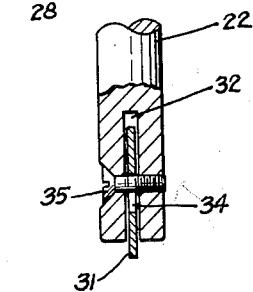

3,064,950
STIRRING DEVICE
Donald G. De Laria, 3118 W. Lake St.,
Minneapolis, Minn.
Filed Dec. 28, 1959, Ser. No. 862,173
2 Claims. (Cl. 259—108)

This invention consists of a stirring device intended for use in cooking materials that must be heated for rather long periods of time, upwards of an hour and a half, to be prepared and which, unless stirred rather regularly, are liable to stick to the bottom of the kettle or pan in which they are being heated.

Accordingly, it is the principal object of this invention to provide a device for stirring foods as they are being heated.

It is a further object of this invention to provide such a stirring device that constantly stirs directly on the bottom of a kettle to prevent materials from sticking thereto as they are being heated therein.

It is still a further object of this invention to provide a stirring device having circulating blades that propel the material being heated in a specific pattern to assure thorough heating of all portions of the material being heated.

It is a still further object of this invention to provide a stirring means that is easily kept in a clean condition.

It is yet another object of this invention to provide a stirring device that is secure when placed on the kettle in which materials are heated and yet may be removed easily when desired.

Still other objects are inherent of the specific structure hereinafter as shown and described.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 1 is a partial side elevation, partial vertical section of a pan equipped with my stirring device;

FIGURE 2 is a reduced sectional view taken on the line 2—2 on FIGURE 1; and

FIGURE 3 is an enlarged fragmentary sectional view on the line 3—3 of FIGURE 1.

Referring to the drawings wherein any given number always designates only one part, the invention is shown in FIGURE 1 mounted on a pan 10. The kettle or pan 10 has an upper flange 12 that is notched as to 14 in FIGURE 2 to receive the legs 15 of the three-legged torque base. At the central portion 16 of the torque base is supported a heat-resisting electric motor 17 having an intimately associated speed reduction structure 18. Motors and speed reducers such as the one used here are commercially available. The speed reducer and hence the motor are supported in any suitable manner as by the studs 19 which extend through and are secured to the central portion 16 of the torque base by means of nuts such as those designated 20. A drive shaft extends out of the speed reduction housing 18 through boss 21 and to this drive shaft that extends out through boss 21 a mixer shaft 22 is secured. Any suitable connecting means may be used such as the bayonet slot 24 being engaged by at least one pin such as the one 25 which is secured to the drive shaft. A coil spring 26 and washer 27 provide tension on the bayonet slot and pin structure as to keep the mixer shaft engaged to the drive shaft of the motor except when it is intended to disconnect them as will be described below.

Intermediate between the legs 15 of the torque base and the bottom 28 of pan 10 and secured fixedly to mixer shaft 22 are the pitched stirring blades, 29 designating the upper one and 30 the lower one. As shown both in FIGURES 1 and 2, these two blades are arranged with their longitudinal axes at an angle to each other, here shown preferably as being arranged at 90 degrees in relation to each other. Both are pitched so that with a counter clockwise rotation of stirring shaft 22, as shown by the solid line arrow in FIGURE 2, these blades tend to force the liquid being stirred toward the top of the pan. The fixed blades 29 and 30 are purposely substantially shorter than the diameter of the kettle 10.

At the lower end of stirring shaft 22 is the pivoted sliding bottom following blade 31. This blade is most effective when it is not pitched—that is, when it extends straight up and down as distinguished from the blades 29 and 30 which are turned or pitched as to provide a propeller action. As may be observed in FIGURE 1, the bottom follower blade 31 is substantially longer than the two pitched fixed position blades. The structure of blade 31 which permits it to yield in response to irregularities in the pan bottom is best shown perhaps in FIGURE 3. In that figure it can be seen that the stirring shaft 22 has a slot therein designated 32 within which the blade 31 may slidably move up and down. The blade 31 itself has a slot therein designated 34 through which any suitable securing means such as the screw 35 may extend from one side of the shaft 22 to the other. Blade 31, therefore, may both pivot and yield slidably. For this reason, slight variations of pan depth may be accommodated by the blade as well as any distortions of the pan bottom, as by the warping indicated at 36 in FIGURE 1 which may cause the blade 31 to tip as shown in that figure. When the blade is past the warped place, however, it may resume a level position in order to continue to stir liquid at the bottom of the pan in other areas. While these stirring devices are made for a particular pan, there is sufficient variation in the dimensions of these pans to make the sliding action of blade 31 important to permit it to adjust itself to contact the bottom of both the deepest and least deep units. In stirring, to prevent cooking materials from sticking, bottom contact is important. By having blade 31 straight up and down rather than pitched, it seems to slide more easily over the bottom of the pan and while at the same time stirring material there effectively to prevent its sticking to the bottom.

As shown in FIGURE 2, the legs 15 of the torque base engage the sides of the notches 14 in flange 12 to resist any tendency of the stirring device to rotate around the pan rather than having the stirring blades rotated within the pan. At the same time, the device lifts from the kettle 10 readily when desired. In use, the bayonet slot 24 and pin 25 provide a ready means for disconnecting the stirring shaft 22 from the driven shaft of the power unit for purposes of cleaning.

*Operation*

In use the kettle 10 is filled with materials that are intended to be cooked and legged torque base 16 is placed on the kettle so that the legs 15 engage in the notches 14 flange 12 of the pan, and the agitator extends into the pan 10. Power is then applied to motor speed reducer 17—18 which causes the agitator of the mixing unit to begin revolving in a counter clockwise direction, as shown in FIGURE 2. As the material at the bottom of the pan is heated, it rises and is encouraged in this rising pattern by the pitched impeller blades 29 and 30 which are so pitched as to urge liquid in the kettle 10 toward the surface. As new material flows toward the surface, the material previously forced up there is displaced laterally. Having been cooled by being at the surface, the earlier material at the surface is then heavier than the material being heated and propelled up through the center of the mass. This cooled, laterally displaced material cascades down the inside of kettle 10 beyond the ends of the impellers 29 and 30. As this same material reaches the bottom of the pan, it is constantly being displaced by new material flowing down the inside kettle surfaces beyond the ends of the impellers 29 and 30, forcing a flow toward the center of the pan 10. Here the cycle of heating, rising, being impelled to the surface, and cascading down the sides is completed and recommences. The continuous process thus causes complete rotation of material within the pan 10 and assures the thorough heating of the materials placed therein. The pitch of blades 29 and 30 plus the fact that they are substantially shorter than the blade 31 makes the flow pattern possible. The agitator of the stirring device rotates very slowly and it is principally through the thorough heating of the materials that a total blending takes place. This is in contrast to mixing devices that mechanically beat material and cause them to become physically mixed. Such devices ordinarily force air into the material and give it a different texture than the result achieved by using a stirring device of the present invention. After heating of the material has been completed, the torque base can be lifted from the pan flange readily to permit removal of the agitator for washing. Removal is effected by compressing spring 26 sufficiently to allow the rotation of shaft 22 and the disassociation of pin 25 from bayonet slot 24.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A stirring device agitator for cooking comprising: a shaft, means secured to said shaft for rotating it, a pair of blades fixed to said shaft and extending therefrom at an angle to each other in spaced relationship on said shaft, said blades being twisted so that a substantial portion of the lower edges lead the upper edges in the direction of rotation, a slot adjacent the end of said shaft opposite to that secured to said shaft rotating means, a flat blade loosely retained in said shaft slot with clearance at both the sides and top of said blade which permits both sliding and pivoting of said blade relative to said shaft, said blade having a slot with closed ends therein, and a holding means fixed to said shaft and extending through the slot of said flat blade at said shaft slotted portion to form a lost motion connection therebetween, said shaft slot having its longitudinal axis extending parallel to the longitudinal axis of said shaft; said blade slot having its longitudinal axis extending transversely of the longitudinal axis of said blade, said blade slot loosely embracing said holding means, said slots having their longitudinal axes substantially parallel, said fixed blades being shorter in longitudinal extension than said flat blade.

2. A stirring device of claim 1 in combination with a kettle having an upper flange, said upper flange having notches therein, a legged member to which said shaft is journalled, the legs of said legged member extending radially from said shaft as far as the closer portions of said notches in said flange and then extending downwardly whereby said legged member can engage the sides of the notches of said flange and hold said legged member against rotation with respect to said kettle, said means for rotating said shaft being power means secured to said legged member.

References Cited in the file of this patent

UNITED STATES PATENTS

| | | |
|---|---|---|
| 321,678 | Breckenridge | July 7, 1885 |
| 368,150 | Hooper | Aug. 9, 1887 |
| 733,161 | Comegys | July 7, 1903 |
| 1,122,735 | Grant | Dec. 29, 1914 |
| 1,449,051 | Mitchell | Mar. 20, 1923 |
| 1,477,653 | La Barre | Dec. 18, 1923 |
| 1,574,104 | Miles | Feb. 23, 1926 |
| 1,734,120 | Farrington | Nov. 5, 1929 |
| 1,841,435 | Gibson | Jan. 19, 1932 |
| 2,146,566 | Daman | Feb. 7, 1939 |
| 2,573,837 | Fox | Nov. 6, 1951 |
| 2,858,117 | Girton | Oct. 28, 1958 |

FOREIGN PATENTS

| | | |
|---|---|---|
| 324,661 | Switzerland | Nov. 15, 1957 |